United States Patent [19]

Munroe

[11] Patent Number: 4,818,158
[45] Date of Patent: Apr. 4, 1989

[54] FLOATING TAP HOLDER
[76] Inventor: Arthur J. Munroe, 2 Sharren La., Enfield, Conn. 06082
[21] Appl. No.: 119,477
[22] Filed: Nov. 12, 1987
[51] Int. Cl.$^4$ .............................................. B23G 1/26
[52] U.S. Cl. .............................. 408/241 R; 10/129 M
[58] Field of Search ............... 408/240, 241 R, 241 S, 408/710, 714, 14, 16, 112; 10/DIG. 1, 129 R, 129 M

[56] References Cited
U.S. PATENT DOCUMENTS 2,680,257  6/1954  Haugeland ...................... 10/DIG. 1
3,653,780  4/1972  Ammatuna ..................... 10/129 R X
4,687,384  8/1987  McCoy ................................. 408/16

Primary Examiner—Z. R. Bilinsky
Attorney, Agent, or Firm—Leon Gilden

[57] ABSTRACT

A floating tap holder has a shank rotatably connected to a hollow sleeve. The hollow sleeve has opposed longitudinally extending slots. A drive shaft connected to a conventional chuck is axially movable within the hollow sleeve. A hand operated drive rod extends transversely through the opposed slots and is secured to the drive shaft. A coil spring received within the hollow sleeve biases the transversely extending drive rod and connected drive shaft axially downward. In use, the freely rotatable shank is received in the chuck of a conventional drill press, milling machine or lathe. A tap is mounted in the chuck of the floating tap holder and positioned in a previously drilled hole to be tapped. The spindle of the machine tool is moved downwardly, thus compressing the spring within the hollow sleeve. Then, the hand operated drive rod is rotated, thus rotating the drive shaft and chuck. The sleeve also rotates with the hand operated drive rod. The floating tap holder serves to maintain alignment of the tap with the center line of the previously drilled hole and also provides an axial feed force by virture of the compressed spring.

4 Claims, 3 Drawing Sheets

FLOATING TAP HOLDER

BACKGROUND OF THE INVENTION

1. Field of the Invention

The present invention relates to floating tap holders, and more particularly pertains to a new and improved floating tap holder which provides a precise alignment of a tap with the center line of a previously drilled hole and also provides a constant axial feed force to the tap. The standard practice for tapping threads in a predrilled hole in a work piece is to use a combination of vertical and rotating hand pressure, while trying to keep as perfect a vertical alignment as possible between the predrilled hole center line and the hand tap. It is also a common practice to reverse the tap rotation one fourth turn for every three fourths turn of tap advance, in order to break the metal chip generated by the tapping operation. This hand tapping method misaligns the tap center line with the predrilled hole center line, causing tap breakage and destroying an expensive work piece such as a tool fixture, die fixture or an expensive machined assembly.

2. Description of the Prior Art

Various types of floating tap holders are known in the prior art. A typical example of such a floating tap holder is to be found in U.S. Pat. No. 4,050,842, which issued to A. Janin on Sept. 27, 1977. This patent discloses a floating spring biased tap holder. No provision, however, is made for a hand actuated drive of the tap. The device includes a rotary cutting tool and a quick change tool holder operative to support the tool in a floating engagement and permitting the tool to shift transversely of the holder through a limited distance. The tool support has a cylindrical holder having a transverse T-slot cut therethrough and shaped to receive a T-shaped tongue portion formed on the tap shank. A sleeve has a bore which is in a snug sliding fit on the cylindrical holder and has a spring normally maintaining the sleeve surrounding the cylindrical holder and surrounding a portion of the length of the shank between the tongue and the cutting edges. Various other floating tool constructions are known in the art. U.S. Pat. No. 3,550,229, which isued to C. Zenses on Dec. 29, 1970, discloses a rasp having a spring biased floating center. U.S. Pat. No. 2,195,645, which issued to E. Gairing on April 2, 1940, discloses a floating pilot bar assembly for a thread chaser. This device is utilized in chasing threads on internal diameter portions of work pieces. U.S. Pat. No. 2,188,584, which issued to J. Tyne on Jan. 30, 1940, discloses a pipe end reamer having a pilot guide bar. U.S. Pat. No. 1,041,675, which issued to H. Robinson on Oct. 15, 1912, discloses a combined reamer and tap. A spring biased floating reamer is secured to a cylindrical flange which is mounted on a conventional tap by a set screw.

Various torque limiting free floating tapping spindles are also disclosed by the prior art. These tapping spindles are designed for use in high production automated transfer line machining operations, and are not suitable or cost effective for use in hand tapping operations.

While the above mentioned devices are suited for their intended usage, none of these devices provides a floating tap holder which utilizes a hand drive rod and insures the alignment of the tap with the center line of a previously drilled hole. Also, none of the above mentioned devices provide for a constant axial feed force on a tap. Further, none of the aforesaid devices provide a floating tap holder which utilizes the chuck of a conventional machine tool such as a drill press, milling machine or lathe to align the tap with the center line of a previously drilled hole, and at the same time allows a hand rotary feed of the tap. Inasmuch as the art is relatively crowded with respect to these various types of floating tap holders, it can be appreciated that there is a continuing need for and interest in improvements to such floating tap holders, and in this respect, the present invention addresses this need and interest.

SUMMARY OF THE INVENTION

In view of the foregoing disadvantages inherent in the known types of floating tap holders now present in the prior art, the present invention provides an improved floating tap holder. As such, the general purpose of the present invention, which will be described subsequently in greater detail, is to provide a new and improved floating tap holder which has all the advantages of the prior art floating tap holders and none of the disadvantages.

To attain this, a representative embodiment of the concepts of the present invention is illustrated in the drawings and makes use of a hollow sleeve provided with opposed longitudinally extended slots. Further, the invention utilizes a drive shaft connected to a conventional chuck for holding a tap. The drive shaft is received within the hollow sleeve and connected to a hand drive rod which extends transversely through the opposed longitudinal slots. The present invention also provides a spring bias of the drive rod to effect a constant axial feed force on the tap. Another feature of the present invention is the use of a freely rotatable shank which may be chucked in a conventional machine tool such as a drill press, milling machine or lathe to insure alignment of the tap with the center line of a previously drilled hole.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting. As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved floating tap holder which has all the advantages of the prior art floating tap holders and none of the disadvantages.

It is another object of the present invention to provide a new and improved floating tap holder which may be easily and efficiently manufactured and marketed.

It is a further object of the present invention to provide a new and improved floating tap holder which is of a durable and reliable construction.

An even further object of the present invention is to provide a new and improved floating tap holder which is susceptible of a low cost of manufacture with regard to both materials and labor, and which accordingly is then susceptible of low prices of sale to the consuming public, thereby making such floating tap holders economically available to the buying public.

Still yet another object of the present invention is to provide a new and improved floating tap holder which provides in the apparatuses and methods of the prior art some of the advantages thereof, while simultaneously overcoming some of the disadvantages normally associated therewith.

Still another object of the present invention is to provide a new and improved floating tap holder which insures alignments of a tap with the center line of a previously drilled hole, while at the same time freeing the hands of the operator for providing a finely controlled rotary feed to the tap.

Yet another object of the present invention is to provide a new and improved floating tap holder which has a freely rotatable shank which is chucked in a conventional machine tool to insure proper alignment of the tap.

Even still another object of the present invention is to provide a new and improved floating tap holder which utilizes a simple, inexpensive hand drive mechanism to allow precise control of the rotary feed of a tap, while at the same time insuring proper alignment thereof.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
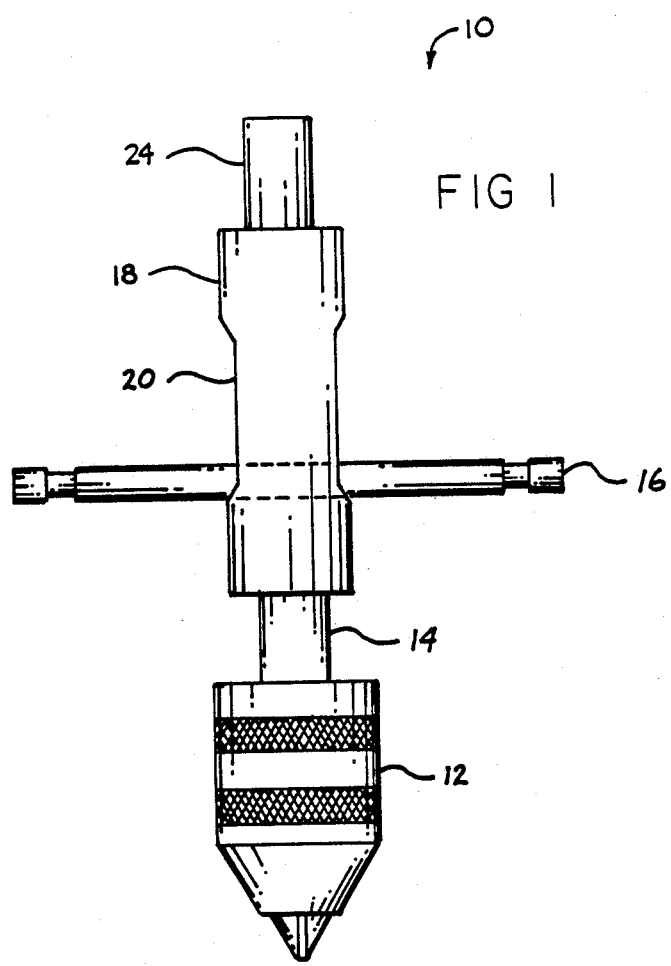
FIG. 1 is a front plan view of the floating tap holder of the present invention.

With reference now to the drawings, and in particular to FIG. 1 thereof, a new and improved floating tap holder embodying the principles and concepts of the present invention and generally designated by the reference numeral 10 will be described.

More specifically, it will be noted that the first embodiment 10 of the invention includes a conventional chuck 12 for holding a tap (not shown). A drive shaft 14 is connected to the chuck 12 and also to a transversely extending hand drive rod 16. The drive shaft is received within a hollow sleeve 18. The hand drive rod 16 extends transversely through the sleeve through opposed longitudinally extending slots 20. A shank 24 is freely rotatably connected to an upper end portion of the shank of the sleeve 18. This connection may be achieved through the use of conventional bearings, or less expensively by providing a bore longitudinally through the center of the shank 24. The bore may be formed oversize and provided with a countersunk end portion for journalling a cap screw which may have a threaded end portion received in the top end of the sleeve 18. Shank 24 would then be free to rotate about the cap screw. Of course various other rotary connections are known to those of ordinary skill in the art, and may be employed without departing from the scope of the present invention.

Figure 2:
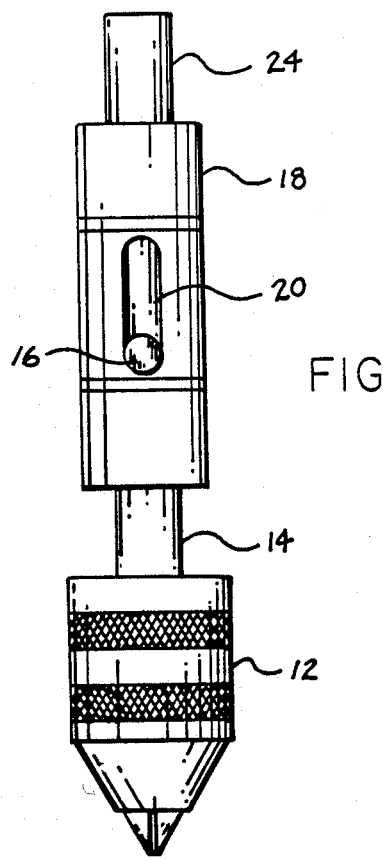
FIG. 2 is a side plan view of the floating tap holder of the present invention.

With reference now to FIG. 2, a longitudinally extending slot 20 and the end of hand drive rod 16 are apparent.

Figure 3:
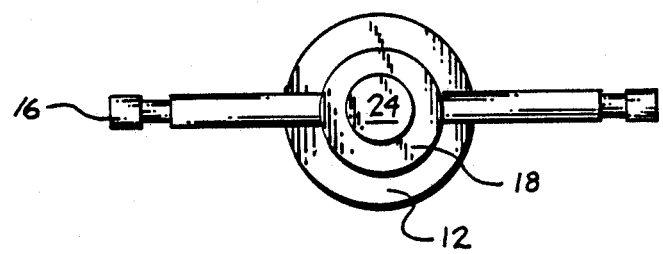
FIG. 3 is a top plan view of the floating tap holder of the present invention.

With reference now to FIG. 3, a top plan view of the floating tap holder of the present invention is provided. The top of rotatable shank 24 as well as transversely extending hand drive rod 16 are illustrated. It is pointed out that the shank 24 has a smaller diameter than sleeve 18. This allows a chuck of a conventional machine tool to be placed over the shank 24, with the top of the sleeve 18 serving as a stop for ensuring correct alignment of the shank 24 in the machine tool chuck.

Figure 4:
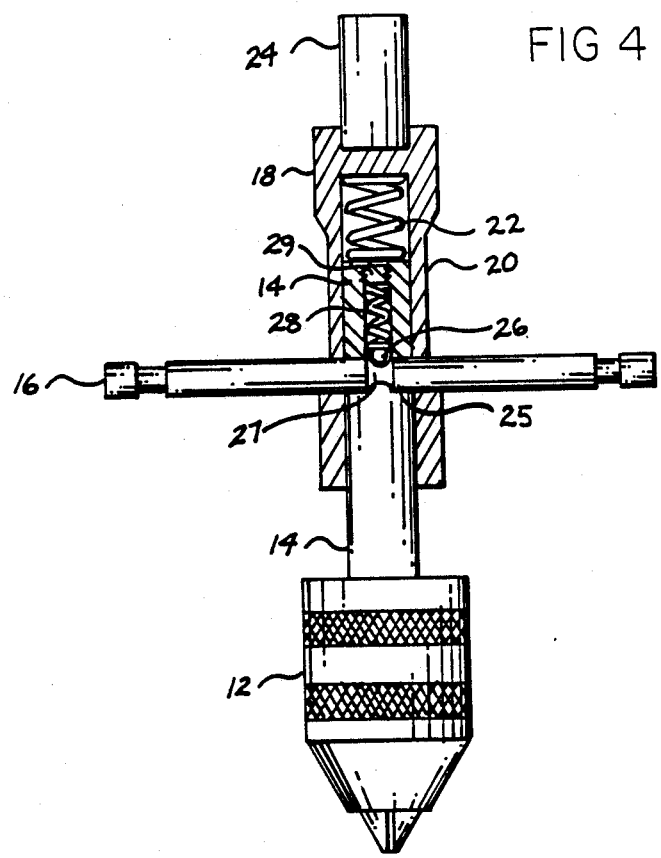
FIG. 4 is a front plan view of the tap holder of the present invention, partially in cross section.

With reference now to FIG. 4, a cross sectional view of the hollow sleeve 18 is provided. It will be seen that a longitudinally extending coil spring 22 is received within the interior of hollow sleeve 18. The spring 22 is biased against an inner end wall of the hollow sleeve 18 and also against hand drive rod 16. It will be further noted that the drive shaft 14 is received in close fitting relationship within the sleeve 18. The hand drive rod 16 is inserted through the longitudinal slots 20 in the sleeve 18 and also through a transverse bore 25 in the drive shaft 14. A ball detent 26 may be provided for engagement with a groove 27 centrally disposed around the circumference of the hand drive rod 16. The ball detent 26 is urged into engagement with the groove 27 by a coil spring 28 received within a longitudinal bore in the drive shaft 14. The bore is closed by a plug 29 after insertion of the ball detent 26 and spring 28.

The operation of the device, which will best be understood with reference to FIG. 4, will now be described. A conventional tap is first chucked in the chuck 12. This chuck may be of a conventional type for example, a Jacobs type chuck. Rotatable shank 24 is then mounted in the chuck of a conventional machine tool such as a drill press, milling machine or lathe. The tap is then positioned within the previously drilled hole to be tapped. It will be apparent to those of ordinary skill in the art that the conventional machine tool may have just been utilized to drill the hole, and thus the spindle of the machine tool will still be in precise axial alignment with the centerline of the hole. This manner of operation avoids the necessity of wasting time in resetting the workpiece in a tapping fixture. The spindle of the conventional machine tool in which the rotatable shank 24 is mounted is then lowered toward the surface of the work piece. This results in the compressing of the coil spring 22. The sleeve 18 will be forced downwardly against the bias of the spring 22 over the drive shaft 14. The transversely extending hand drive rod 16 will now be positioned adjacent the upper ends of the opposed slots 20. With the device in this condition, it will be understood, that the chuck 12 and tap mounted therein will be biased toward the work piece by the action of spring 22. The tap will also be held in precise alignment with the center line of the previously drilled hole by virtue of engagement of the rotatable shank 24 in the chuck of a conventional machine tool. With the device in this condition, the operator rotates the drive shaft 14 by turning hand drive rod 16. This will concurrently rotate chuck 12, the tap mounted therein, and the hollow sleeve 18. After every three fourths turn of the tap in a clockwise direction, the operator's hands are free to reverse the rotation of the tap one fourth turn to insure chip breakage. The operator need not concern himself with the alignment of the tap in the previously drilled hole, this function being inherent in the use of the floating tap holder of the present invention. It is to be emphasized that the spring bias provided by coil spring 22 allows the tap to be reversed, and provides a constant axial feed force. These features serve to drastically reduce the incidents of tap breakage as compared with the operation of traditional hand tapping fixtures.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A floating tap holder, comprising:
    chuck means for holding a tap;
    spring means for exerting an axial feed force on said chuck means;
    hollow sleeve means;
    said hollow sleeve means provided with opposed longitudinal slots;
    a drive shaft connected to said chuck means and slidably received in said hollow sleeve means; and
    a transversely extending drive rod connected to said drive shaft and received for longitudinal movement in said slots.

2. The floating tap holder of claim 1, wherein said spring means comprises a coil spring received in said hollow sleeve means engaging an end portion of said drive shaft.

3. The floating tap holder of claim 1, further comprising a freely rotatable shank connected to an upper end portion of said hollow sleeve means.

4. A floating tap holder, comprising:
    a chuck for holding a tap;
    a hollow cylindrical sleeve;
    opposed longitudinal slots formed in said hollow sleeve;
    a circular drive shaft received for axial movement in said hollow sleeve and connected to said chuck for rotating said chuck;
    a hand operable drive rod, connected to said drive shaft, extending transversely through said opposed slots;
    a centrally disposed groove extending around the circumference of said hand drive rod;
    a spring ball detent in a longitudinal bore in said drive shaft for engagement with said hand drive rod groove;
    a longitudinally extending coil spring for axially biasing said chuck means received in said hollow sleeve and engaging an end of said drive shaft;
    a shank rotatably connected to an upper end portion of said hollow sleeve; and
    said shank having a smaller diameter than an outer diameter of said upper end portion of said hollow sleeve.

* * * * *